United States Patent [19]

Matsukawa et al.

[11] Patent Number: 4,919,699
[45] Date of Patent: Apr. 24, 1990

[54] PROCESS OF REMOVING PLATINUM INCLUSIONS FROM LASER GLASS

[75] Inventors: Michimasa Matsukawa; Tetsuro Izumitani; Kunio Takeuchi, all of Tokyo, Japan

[73] Assignee: Hoya Corporation, Tokyo, Japan

[21] Appl. No.: 222,286

[22] Filed: Jul. 21, 1988

Related U.S. Application Data

[63] Continuation of Ser. No. 894,058, Aug. 7, 1986, abandoned.

[30] Foreign Application Priority Data

Aug. 9, 1985 [JP] Japan ................... 60-174024

[51] Int. Cl.⁵ .................. C03B 5/225; C03B 5/235
[52] U.S. Cl. ...................... 65/134; 65/32.5; 65/136
[58] Field of Search ............ 65/32.5, 3.13, 134, 65/136, 178; 75/83; 423/22

[56] References Cited

U.S. PATENT DOCUMENTS

| | | | |
|---|---|---|---|
| 3,867,303 | 2/1975 | Shaw | 501/47 |
| 3,901,718 | 8/1975 | Wu | 501/27 |
| 3,929,440 | 12/1975 | Oldfield | 65/136 |
| 3,955,991 | 5/1976 | Young | 501/51 |
| 3,997,313 | 12/1976 | Alexander | 65/134 |
| 4,462,970 | 7/1984 | Pastor | 423/263 |
| 4,539,033 | 9/1985 | Beales | 65/900 X |
| 4,554,259 | 11/1985 | Franklin | 501/67 |
| 4,560,666 | 12/1985 | Yoshida | 501/5 |

FOREIGN PATENT DOCUMENTS 56-149332  11/1981  Japan .

Primary Examiner—Kenneth M. Schor
Attorney, Agent, or Firm—Cushman, Darby & Cushman

[57] ABSTRACT

A process of removing platinum inclusions from laser glass is disclosed, comprising bubbling the laser glass in a molten state with $PCl_3$ or $POCl_3$.

7 Claims, 2 Drawing Sheets ns are 5 to 30 microns in size.
PROCESS OF REMOVING PLATINUM INCLUSIONS FROM LASER GLASS This is a continuation of application Ser. No. 894,058, filed Aug. 7, 1986, which was abandoned upon the filing hereof.

FIELD OF THE INVENTION

The present invention relates to a process of removing platinum inclusions from laser glass.

BACKGROUND OF THE INVENTION

Laser glass is produced by melting in a platinum vessel because it is required to have high uniformity. Thus the laser glass inevitably contains platinum inclusions. With a recent increase of a laser output, it has been revealed that platinum colloids (platinum inclusions) of such size and number that have been accepted cause damage on the glass due to laser, and formation of such platinum colloids is becoming a serious problem in production of laser glass.

Particularly in laser glass to be used as an amplifier for nuclear fusion, since an output of 8 to 10 J/cm$^2$ is sought, platinum inclusions are responsible for thermal damage; they are vital defects. These platinum inclusions are 5 to 30 microns in size.

In connection with the mechanisms of formation of platinum inclusions, it is reported by R. J. Ginter, *J. Non-Cryst. Solids*, Vol. 6, p. 294 (1971) that a vapor of platinum oxide evaporated from a platinum vessel condenses on low temperature areas, for example, on the upper portion of a shaft of a rotary stirrer, separates therefrom and drops, and is reduced in a molten glass, resulting in the formation of platinum inclusions.

Based on this theory, the following methods have been employed to prevent the formation of platinum inclusions. That is, one of the methods is to remove a platinum oxide vapor while preventing oxidation of platinum by flowing a reducing gas in a zone made of platinum, as described in the above *J. Non-Cryst. Solids*. Another physical method is such that the above shaft is provided with a flange to prevent condensed platinum from dropping into the molten glass.

These methods, however, fail to completely remove platinum inclusions. The reason for this is that the mechanism of formation of platinum inclusions also includes the phenomenon of deposition of platinum eluted from the vessel into the molten glass as a result of super saturation. All the above conventional methods are to control the molten glass from outside. Thus, the methods do not have any relation with the formation of platinum colloids in the molten glass; therefore, they cannot prevent the formation of platinum colloids or rather the reducing gas accelerates the formation of platinum colloids.

SUMMARY OF THE INVENTION

An object of the present invention is to provide a process for producing platinum-free laser glass by ionizing platinum to prevent the formation of platinum inclusions or by dissolving and ionizing platinum contaminants already present in a molten glass to completely remove platinum inclusions.

The present invention is a process of removing platinum inclusions from laser glass which comprises bubbling laser glass in a molten state with PCl$_3$ or POCl$_3$.

BRIEF DESCRIPTION OF THE INVENTION

FIG. 1 is a cross-sectional view of an apparatus for use in the practice of the present invention; and FIGS. 2 and 3 show light transmittance curves of glass obtained in Examples 1 and 2, respectively.

DETAILED DESCRIPTION OF THE INVENTION

In the present invention, platinum inclusions can be removed from any conventional laser glasses as described, for example, in U.S. Pat. Nos. 4,108,674, 4,120,814 and 4,239,645. Typical examples of laser glass include a phosphate laser glass, a silicate laser glass and a silico-phosphate laser glass, whose glass compositions (by weight) are: for example, 70% of P$_2$O$_5$, 7% of Al$_2$O$_3$, 10% of K$_2$O, 10% of BaO, and 3% of Nd$_2$O$_3$ for the phosphate laser glass; 60% of SiO$_2$, 4% of Al$_2$O$_3$, 20% of Na$_2$O, 15% of BaO, and 1% of Nd$_2$O$_3$ for the silicate laser glass; and 70% of P$_2$O$_5$, 10% of Al$_2$O$_3$, 5% of Li$_2$O, 10% of SiO$_2$, and 5% of Nd$_2$O$_3$ for the silico-phosphate laser glass.

For ionization of platinum, laser glass in a molten state is bubbled with PCl$_3$ or POCl$_3$ with O$_2$ as a carrier gas. The extent of ionization of platinum colloids in glass to dissolve can be controlled by changing a vapor pressure (or temperature) of PCl$_3$ or POCl$_3$, a flow rate of a carrier gas, a bubbling time, and a temperature of the molten glass.

N$_2$ is preferably introduced in the O$_2$ carrier gas since coloration and ultraviolet ray absorption of the laser glass due to Pt ions can be prevented.

The present invention has been attained by the discovery that molten glass is ionized by introducing chlorides and platinum is easily ionized as compared with O$_2$, and that PCl$_3$ and POCl$_3$ have excellent ionization effect among the chlorides. Of PCl$_3$ and POCl$_3$, PCl$_3$ is easy to ionize, but POCl$_3$ is smaller in ultraviolet absorption than PCl$_3$. When the carrier gas consists only of N$_2$, platinum colloids tend to be formed particularly in the case of PCl$_3$. O$_2$ is excellent in ionization because of its high oxidizing properties. However, if used alone, ultraviolet absorption due to Pt ions tends to occur. Thus it is preferred to introduce N$_2$ in a proportion of up to 40% by volume, more preferably 3 to 30% by volume, of the total carrier gas in order to prevent ultraviolet absorption. If, however, the N$_2$ content is in excess of the above range, platinum colloids tend to be formed.

Figure 1:
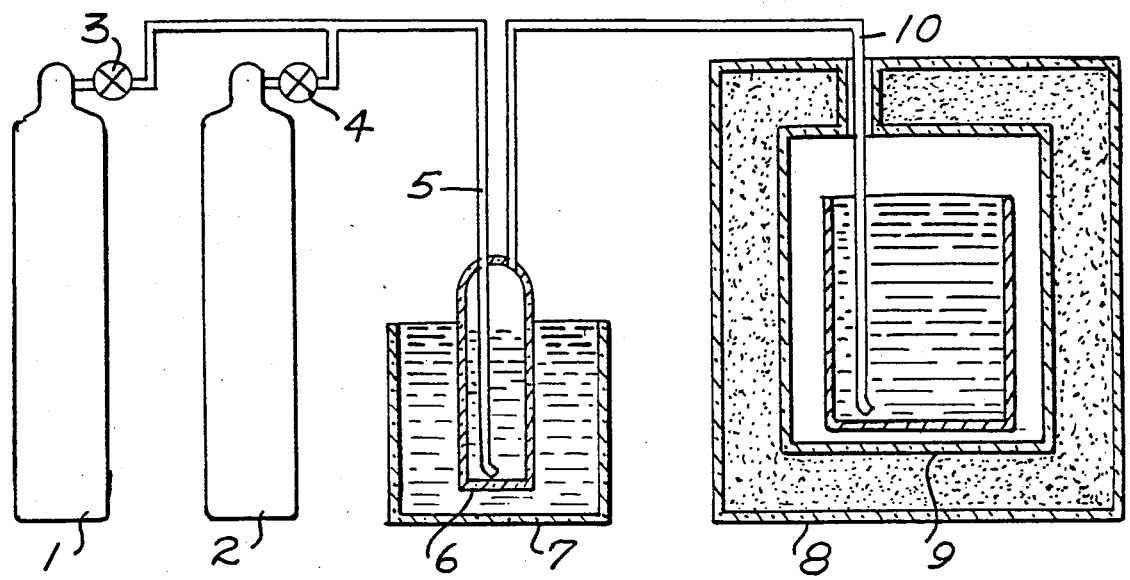

FIG. 1 is a cross-sectional view of an apparatus for use in the practice of the present invention. The apparatus comprises a gas generation department and a bubbling dissolution department. Carrier gases O$_2$ and N$_2$ from an oxygen bomb 1 and a nitrogen bomb 2 are controlled in a N$_2$/O$_2$ ratio and a flow rate by an oxygen flow meter 3 equipped with a pressure adjustor and a nitrogen flow meter 4 equipped with a pressure adjustor, respectively, and are sent to an evaporator 6 through a tube 5. PCl$_3$ or POCl$_3$ is placed in an evaporator 6 and soaked in an oil bath 7 to control the temperature so that the desired vapor pressure (generally 100 to 600 mmHg, preferably 150 to 500 mmHg) can be obtained. The carrier gas is passed through the evaporator 6 to generate PCl$_3$ or POCl$_3$ gas, introduced in a molten glass in a platinum vessel 9 placed in an electric furnace 8, through a bubbling tube 10 made of silica, alumina or platinum, and bubbled in the glass for a predetermined time (generally 15 min. to 15 hours, preferably 30 min.

to 10 hours) at the flow rate generally of 0.2 to 10 liter/min and preferably 0.3 to 8 liter/min. In FIG. 1, details of a temperature-controlling means of the oil bath 7 and the electric furnace 8 are omitted. In the practice of the present invention, the conventional techniques can be employed in combination; for example, reducing gas is flown along the walls of the platinum vessel 9.

The present invention is described in greater detail with reference to the following examples.

EXAMPLE 1

An apparatus as shown in FIG. 1 was used. With only $O_2$ in the oxygen bomb 1 as a carrier gas, bubbling was conducted with $PCl_3$ or $POCl_3$ vapors. The flow rate of the gas was 0.8 liter/min, the vapor pressures of $PCl_3$ and $POCl_3$ were both 200 mmHg (the temperatures of the oil bathes were 40° C. and 65° C., respectively), and the bubbling tube 5 was a quartz tube having an inner diameter of 6 mm. Laser glass LHG8 (produced by HOYO CORPORATION) was filled in a 2-liter platinum vessel 9 and bubbled at a furnace temperature of 1,200° C. for 1.5 hours.

Figure 2:
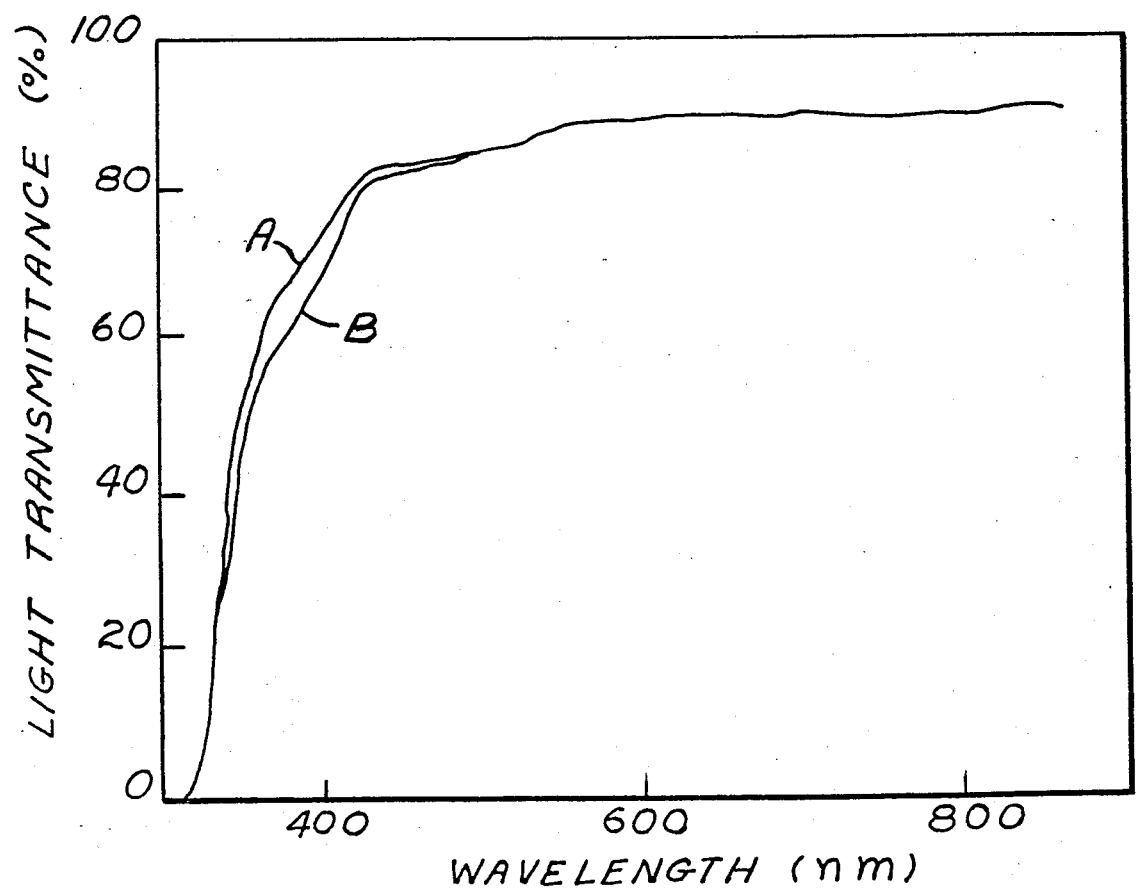

FIG. 2 is a graph of light transmittance curve of glass showing the results of the above bubbling. In order to observe the ultraviolet absorption of glass due to Pt ionization, a glass not doped with $Nd_2O_3$ was used. In FIG. 2, the light transmittance curve A indicates the results when $POCl_3$ was used and the light transmittance curve B indicates the results when $PCl_3$ was used. In each case, the thickness of the specimen was 10 mm. It is seen that $POCl_3$ is smaller in ultraviolet absorption of glass than $PCl_3$.

EXAMPLE 2

The above bubbling was conducted with $POCl_3$ wherein the $N_2/O_2$ ratio in the carrier gas was changed. The glass was doped with 2 wt% of $Nd_2O_3$.

The table below shows a relation between the $N_2/O_2$ ratio (by volume) and the transmittance at 400 nm of the glass. In each case, the thickness of the sample was 10 mm.

| $N_2/O_2$ | 400 nm Transmittance (%) |
|---|---|
| 0/100 | 73.4 |
| 20/80 | 74.2 |
| 30/70 | 75.6 |
| 40/60 | 76.4 |

Figure 3:
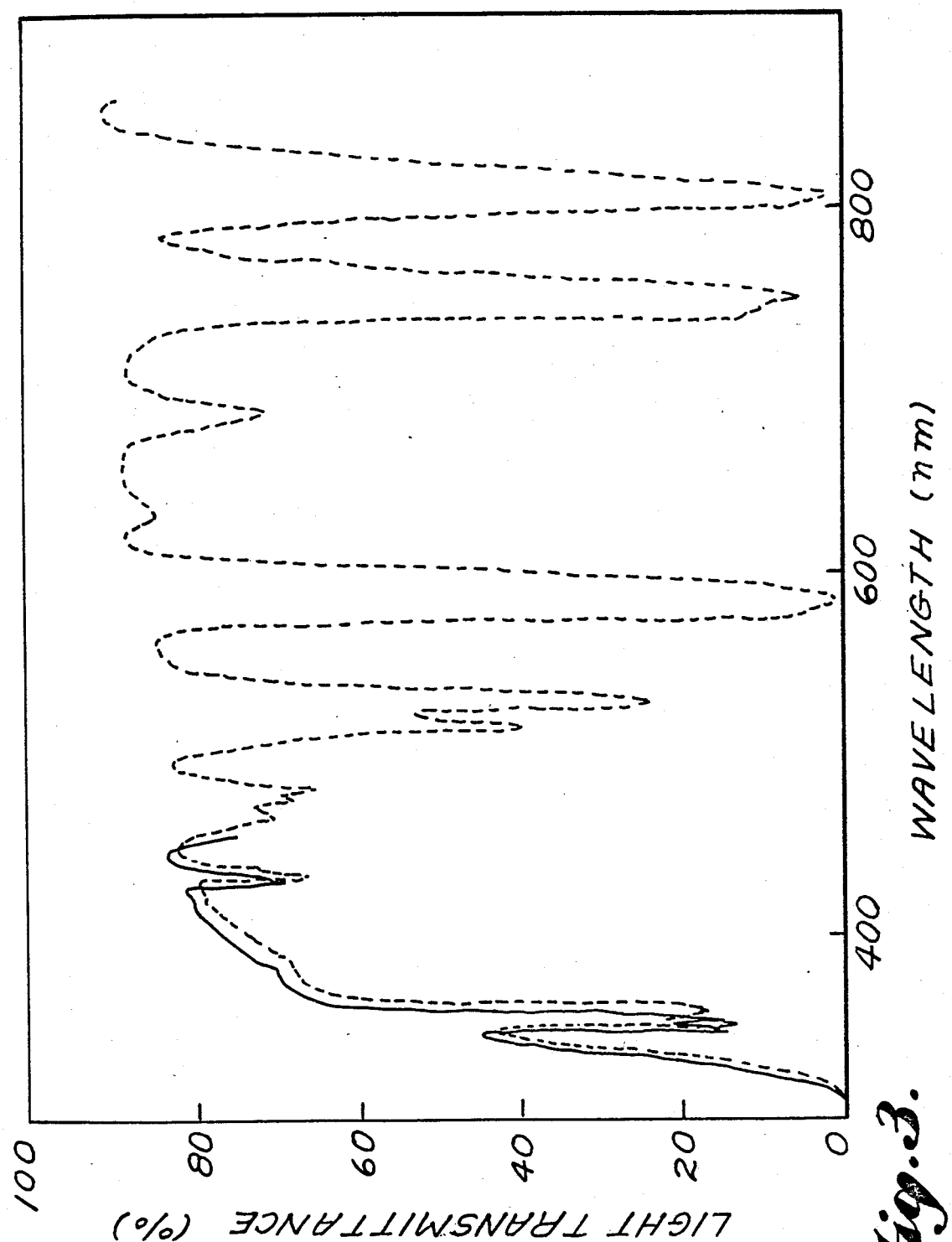

FIG. 3 is a graph showing glass light transmittance wherein the light transmittance curve C (solid line) indicates the case where the $N_2/O_2$ ratio is 40/60 by volume, in which only an ultraviolet region (310 to 450 nm) is shown, and the light transmittance curve D (broken line) indicates the case where only $O_2$ is used. It is seen that, by intermingling $N_2$, the ultraviolet absorption of the glass is reduced.

In accordance with the present process, platinum can be effectively ionized and removed by bubbling the chlorides of phosphorous at the final stage of the laser glass dissolution process. Since a bubbling tube of e.g., quartz, alumina and platinum is merely inserted in a platinum vessel from the upper portion thereof, the process is easy. Furthermore, there can be obtained glass freed of platinum inclusions at greatly increased yield as compared with the conventional methods.

While the invention has been described in detail and with reference to specific embodiments thereof, it will be apparent to one skilled in the art that various changes and modifications can be made therein without departing from the spirit and scope thereof.

What is claimed is:

1. A process for forming a laser glass by removing platinum inclusions from the laser glass, said inclusions having been formed while said laser glass was in a molten state, said process comprising the following steps:

placing glass, having a composition which permits it to be used as a laser glass in a vessel, said vessel having at least an interior surface of platinum, said glass contacting at least a portion of said platinum;

heating said glass in said vessel, so that said glass is heated at least to the point of said glass being molten and a portion of said platinum, which remains in contact with the glass is eluted into said glass, said glass having sufficiently reduced viscosity to enable a gas to bubble through;

bubbling $PCl_3$ or $POCl_3$ vapors and an $O_2$ carrier gas which contains $N_2$ gas so as to prevent coloration and ultraviolet ray absorption of said laser glass, through said molten glass for a time period sufficient to remove said platinum inclusions by reacting said platinum inclusions with $PCl_3$ or $POCl_3$ to ionize said platinum inclusions in the form of a complex ion of platinum and chlorine resulting in said molten glass being substantially free of platinum inclusions; and forming a laser glass from said molten glass.

2. A process as in claim 1, wherein said carrier gas contains up to 40% by volume of $N_2$, the remainder of said carrier gas being $O_2$.

3. A process as in claim 1, wherein said carrier gas contains from 3 to 30% by volume of $N_2$, the remainder of said carrier gas being $O_2$.

4. A process as in claim 1 wherein said $PCl_3$ or $POCl_3$ gas is introduced at a vapor pressure of 100–600 mm Hg.

5. A process as in claim 1 wherein said $PCl_3$ or $POCl_3$ gas is bubbled through said glass at a flow rate of 0.2 to 10 liter/min.

6. A process as in claim 1 wherein said time period for bubbling $PCl_3$ or $POCl_3$ through said glass is 15 minutes to 15 hours.

7. A process for forming a laser glass by removing platinum inclusions from the laser glass, said inclusions having been formed while said laser glass was in a molten state, said process comprising the following steps:

placing glass, having a composition which permits it to be used as laser glass in a vessel, said vessel having at least an interior surface of platinum, said glass contacting at least a portion of said platinum;

heating said glass in said vessel, so that said glass is heated at least to the point of said glass being molten and a portion of said platinum, which remains in contact with the glass is eluted into said glass, said glass having sufficiently reduced viscosity to enable a gas to bubble through;

bubbling $PCl_3$ or $POCl_3$ having a vapor pressure of 100–600 mm Hg using an $O_2$ carrier gas which contains $N_2$ gas so as to prevent coloration and ultraviolet ray absorption of said laser glass, through said molten glass at a flow rate of 0.2 to 10 liter/min. for a time period of 15 min. to 15 hours to ionize said platinum inclusions in the form of a complex ion of platinum and chlorine by the reaction with said $PCl_3$ or $POCl_3$, resulting in said molten glass being substantially free of platinum inclusions; and forming a laser glass from said molten glass.

* * * * *